April 22, 1930.   H. KATTWINKEL   1,755,355
MANUFACTURE OF FRICTION BODIES
Filed Oct. 14, 1926
FIG.1.
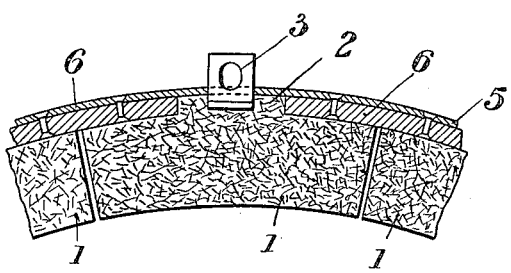
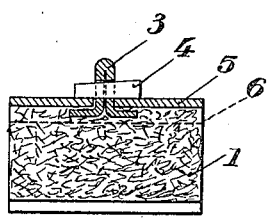
FIG.2.
H. Kattwinkel
inventor
By Marks & Clerk
Att'ys.

Patented Apr. 22, 1930

1,755,355

UNITED STATES PATENT OFFICE

HANS KATTWINKEL, OF COSWIG, GERMANY

MANUFACTURE OF FRICTION BODIES

Application filed October 14, 1926, Serial No. 141,590, and in Germany December 14, 1925.

My invention relates to friction bodies, more particularly for the coating of brake bands and the like, and also for the mutually engaging members of friction clutches. Such bodies are generally manufactured by saturating a fabric of suitable thickness with resin-like binding media, more particularly with a solution of artificial resin (a condensation product of phenol and formaldehyde), and then hardening the material with the application of pressure and heat. It has also already been proposed to manufacture friction bodies of this kind directly from loose fibres mixed with the binding medium instead of from impregnated fabric. In this case the procedure has been to mix disintegrated asbestos fibres for example with an alcoholic solution of the phenolic condensation product in the ratio of about 40 parts of the latter to 60 parts of asbestos and to warm the mass under pressure until the desired hardness was attained.

For the manufacture of particularly thick brake blocks, such for example as are employed for the brake bands of hauling engines, these known processes are not directly applicable. The obvious device of superposing a plurality of frictional coverings manufactured by the first process hereinbefore mentioned is therefore in practice out of the question, because brake blocks prepared in this manner readily give rise to disturbances even before this layer is completely worn out, as the connecting means for the individual layers of fabric become for the most part inoperative, so that the rest of the worn layer easily becomes loose. Furthermore the connecting of the individual layers of fabric leads to disadvantages, more particularly in so far as the connecting means in question, in the event of heavy stressing of the brake or the like, in consequence of the high heating, become carbonized or otherwise inoperative, so that a separation of the individual layers may also occur from this cause.

In the case of the second known process mentioned, which starts from a loose, fibrous mass impregnated with the binding medium, difficulties arise when it is a question of the manufacture of particularly thick friction bodies, owing to the fact that the unmoulded mass, the initial volume of which, linearly reckoned, amounts to about eight times that of the finished brake body, admits with difficulty of being dealt with in the moulding press. The press would therefore have to have quite inconveniently large dimensions in the direction of the pressure, which presupposes a construction which is not simple, easily leads to disturbances in working, and finally does not work economically.

The invention provides remedies for these defects owing to the fact that the impregnated fibrous material, which moreover as regards the ratio to the impregnating medium is given a composition differing from that of the known process, is not directly pressed and hardened under the action of heat, but is first only dried and is then subjected to a preliminary pressing in a cold condition, and the pressing into the final shape under the action of heat, which goes hand in hand with the hardening, only takes place after the said preliminary pressing.

The process is preferably carried out in the following manner: The asbestos is first disintegrated, and then saturated in the ratio of about 3 to 1 with the phenolic condensation product, dissolved in alcohol. The mass is then thoroughly mixed in a revolving drum and thereupon dried, preferably without the action of heat. The dried mass is then pressed into solid cakes, which as regards length and breadth preferably already have substantially about the dimensions of the friction body to be manufactured. Of these cakes as many as are required for obtaining the brake block or other friction body of the desired thickness are then superposed and placed in the pressing mould, in which they receive their final form. The pressing mould, preferably after preliminary heating, is placed in the press, and after the exerting of the pressure requisite for the hardening, is locked, so that this pressure continues to be maintained even after the removal of the mould from the press. For this purpose the pressing mould, which is constructed in a plurality of parts, is equipped with suitable locking members, such for example as wedge or screw connections. The mould taken out of the press is then placed in the hardening oven, where it is exposed, in the manner which is usual in the hardening of articles made from phenolic condensation products, for rather a long time to a rather high temperature, the pressure being maintained.

The finished product constitutes a unitary body, the material of which is completely homogenous from every point of view, so that uniform wear during its whole life is ensured. In order to enable such blocks to be worn as nearly as possible down to the last remnant of the operative frictional material before they become unusable, the connecting with the braking member in question is preferably effected in the manner illustrated in the drawing, in which:

Fig. 1 shows a section through a part of a brake band of a winding engine equipped with the brake blocks in question, in a plane perpendicular to the axis of the brake drum, while Fig. 2 shows a section in an axial plane.

As may be seen more particularly in Fig. 1, the brake blocks 1 are provided, on the convex outer side, the curvature of which corresponds to that of the associated brake drum, with a strip-like projection 2, which preferably extends over the entire breadth of the block (compare Fig. 2). The blocks are inserted with these strips in concavities of corresponding breadth which are formed by riveting flat iron pieces 6 to the brake band 5 at corresponding peripheral distances. These pieces of flat iron form, for the brake blocks, abutments which take up the stresses occurring in the peripheral direction. The actual connecting of the blocks to the brake band is effected through the medium of pierced flaps 3, which are embedded with their bent-out foot members in the material of the brake bodies during the moulding of the latter, within the strip-like projections 2, care being taken that the foot members do not extend into the brake body a distance equal to the thickness of the strips 2. By this means the result is obtained that the brake bodies can be worn away almost down to the last remnant, as contrasted with blocks secured directly to the brake bands by rivets or the like, which have hitherto been customary and which have generally already become useless after being worn down to one-half. Into the hole in the flap 3 passing outwards through a slot in the brake band is driven, as shown in Fig. 2, a bolt or wedge 4, which ensures the secure connection of the block to the brake band.

I claim:

1. A method of the character described, comprising the steps of intimately mixing loose asbestos fibres with a solution of a phenolic condensation product, drying the mixture, pressing it into solid cakes, superposing a plurality of such cakes, pressing them together into the final shape of the body to be manufactured, and hardening the compressed mass under the influence of heat.

2. A method of the character described, comprising the steps of mixing loose fibres with a solution of an artificial resin, drying the mass thus produced without the action of heat, pressing it into solid cakes, superposing a plurality of such cakes, pressing them together into the final shape of the body to be manufactured, and hardening the compressed mass under influence of pressure and heat.

3. A method of the character described, comprising the steps of mixing loose fibrous material with a binding medium in finely divided condition, drying the mass thus produced, pressing it into solid cakes, superposing a plurality of such cakes, pressing them together into the final shape of the body to be manufactured, and hardening the compressed mass.

In testimony whereof I affix my signature.

HANS KATTWINKEL.